UNITED STATES PATENT OFFICE.

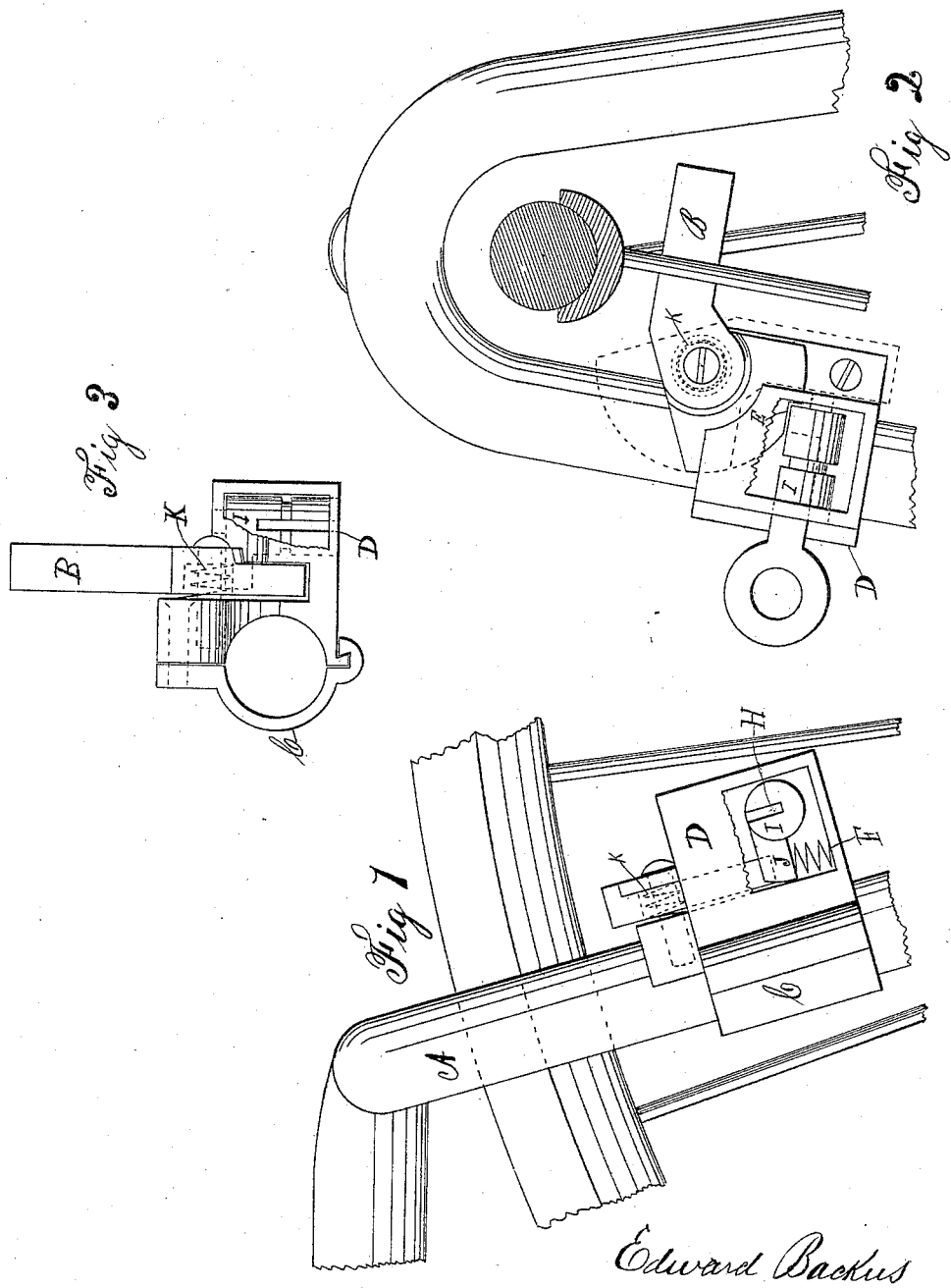

EDWARD BACKUS, OF ROCHESTER, NEW YORK.

BICYCLE-LOCK.

SPECIFICATION forming part of Letters Patent No. 436,453, dated September 16, 1890.

Application filed April 7, 1890. Serial No. 346,836. (No model.)

*To all whom it may concern:*

Be it known that I, EDWARD BACKUS, a citizen of the United States, residing at Rochester, in the county of Monroe and State of New York, have invented certain new and useful Improvements in Bicycle-Locks, of which the following is a specification.

My invention relates to improvements in bicycle-locks; and the object of my invention is to provide an easy, safe, and convenient method of locking the wheels of a bicycle when not in use by attaching a locking device permanently to the frame of a bicycle.

I attain this object by the mechanism illustrated in the accompanying drawings, in which—

Figure 1 is a side elevation of the lock attached to the frame, and shows a section of the wheel and spokes and part of the case cut away to show the operation of the lock. Fig. 2 is a rear elevation, and shows a section of a wheel and spokes with the lever B extending through them. The break in the case shows the manner of locking and unlocking the lever, and the dotted lines show the position of the lever when the wheel is unlocked. Fig. 3 is a plan of the lock alone.

Similar letters refer to similar parts throughout the several views.

On the frame of a bicycle in any convenient place, but preferably on the rear brace, I attach a sleeve C, that is made in halves and of the proper size and shape to fit the frame. One side of this sleeve C is fitted with a dovetail and the other side is fastened with screws. On the upper end of this sleeve C an ear rises, and to this is hinged a lever B. This lever moves in a quarter-circle, from horizontal to vertical. When it is horizontal, it projects through and between the spokes and prevents the wheel from revolving. The other end of this lever B extends back from the fulcrum and is notched to receive a dog J, and also serves as a brace to resist the side pressure from the spokes. This dog J is pressed up against the lever B and into the notch E by the coil-spring F, and is surrounded by a case D, that is a part of and firmly attached to sleeve C. Inside of this case D and connected to the dog J is placed any suitable locking device operated by a key or other device.

The operation is as follows: When it is desired to lock the machine the rider raises the lever B to a horizontal position between the spokes of the wheel. The dog J engages with the back end of lever B by the action of spring F, and the machine is firmly and securely locked. The case D protects the dog J from being operated by any person not having the proper key.

When it is desired to unlock the machine the key is inserted in slot H and the cylinder I is revolved, which throws dog J out of the notch E, and lever B assumes a vertical position, as shown by dotted lines in Fig. 2. The machine is then unlocked and the wheel is free to revolve.

I claim—

In a bicycle-lock, the lever B, pivoted to the fork or any other immovable part of a bicycle, with a quadrant extending from this pivot and so notched or otherwise constructed as to receive the dog of the locking device, the other end of this lever free and supported entirely from its pivoted end, substantially as shown, and for the purpose set forth.

EDWARD BACKUS.

Witnesses:
WILLIAM B. BURKE,
HARRY E. BACKUS.